US010869425B1

(12) United States Patent
Siudyla et al.

(10) Patent No.: US 10,869,425 B1
(45) Date of Patent: Dec. 22, 2020

(54) UTILITY VEHICLE WITH ONBOARD AND REMOTE CONTROL SYSTEMS

(71) Applicant: Hydro-Gear Limited Partnership, Sullivan, IL (US)

(72) Inventors: Jake Siudyla, Sullivan, IL (US); Alyn G. Brown, Indianapolis, IN (US); Ivan E. Fox, Mattoon, IL (US); Jesse L. Probst, Strasburg, IL (US); Scott W. Keller, Charleston, IL (US); K. Mike McCoy, Avon, IN (US)

(73) Assignee: Hydro-Gear Limited Partnership, Sullivan, IL (US)

(*) Notice: Subject to any disclaimer, the term of this patent is extended or adjusted under 35 U.S.C. 154(b) by 0 days.

(21) Appl. No.: 16/859,541

(22) Filed: Apr. 27, 2020

Related U.S. Application Data

(60) Continuation of application No. 15/870,341, filed on Jan. 12, 2018, now Pat. No. 10,631,456, which is a (Continued)

(51) Int. Cl.

*A01D 34/00* (2006.01)
*G05D 1/00* (2006.01)

(Continued)

(52) U.S. Cl.

CPC ........... *A01D 34/008* (2013.01); *A01D 34/64* (2013.01); *A01D 34/76* (2013.01); *A01D 34/828* (2013.01);

(Continued)

(58) Field of Classification Search

CPC ............... G05D 1/0011; G05D 1/0022; G05D 2201/0208; B62D 1/00; B62D 11/003;

(Continued)

(56) References Cited

U.S. PATENT DOCUMENTS

| | | | | |
|---|---|---|---|---|
| 4,951,769 A * | 8/1990 | Kawamura | B60K 6/46 | 180/65.245 |
| 5,513,719 A * | 5/1996 | Moroto | B60W 10/26 | 180/65.21 |

(Continued)

FOREIGN PATENT DOCUMENTS

| | | |
|---|---|---|
| CN | 201758565 | 3/2011 |
| JP | S6239331 | 2/1987 |

(Continued)

*Primary Examiner* — Arpad Fabian-Kovacs

(74) *Attorney, Agent, or Firm* — Neal, Gerber & Eisenberg LLP

(57) ABSTRACT

A utility vehicle having operator selectable onboard and remote controls also includes a prime mover and a power generating device driven thereby, first and second electric wheel motors, and a drive controller in communication with the wheel motors to control the output thereof and in communication with the onboard controls. A radio control receiver is in communication with the drive controller and with a radio control transmitter having steering and speed controls. The vehicle includes a control mode switch having a first position where the drive controller receives steering and speed control inputs from the onboard controls, and a second position where the drive controller receives steering and speed control inputs from the radio control transmitter.

20 Claims, 3 Drawing Sheets

Related U.S. Application Data division of application No. 14/925,634, filed on Oct. 28, 2015, now Pat. No. 9,867,331.

(60) Provisional application No. 62/168,394, filed on May 29, 2015, provisional application No. 62/069,734, filed on Oct. 28, 2014.

(51) Int. Cl.

| | |
|---|---|
| ***A01D 34/76*** | (2006.01) |
| ***A01D 34/64*** | (2006.01) |
| ***A01D 34/82*** | (2006.01) |
| ***B62D 11/04*** | (2006.01) |
| ***B62D 11/00*** | (2006.01) |
| ***B62D 1/00*** | (2006.01) |

(52) U.S. Cl.

CPC .............. *B62D 1/00* (2013.01); *B62D 11/003* (2013.01); *B62D 11/04* (2013.01); *G05D 1/0011* (2013.01); *G05D 1/0022* (2013.01); *G05D 2201/0208* (2013.01); *Y10S 903/903* (2013.01)

(58) Field of Classification Search

CPC ...... B62D 11/04; B62D 5/0418; B62D 7/023; Y10S 903/903; B60K 7/0007; B60K 1/02; B60K 6/46; B60K 17/043; B60K 2007/0092; B60K 17/30; B60K 2370/55; A01D 34/006; A01D 69/02; A01D 34/78; A01D 34/008; A01D 69/025; A01D 34/828; A01D 34/76

See application file for complete search history.

(56) References Cited

U.S. PATENT DOCUMENTS

| | | | | |
|---|---|---|---|---|
| 6,044,316 | A | 3/2000 | Mullins | |
| 6,591,593 | B1 | 7/2003 | Brandon et al. | |
| 6,717,281 | B1 | 4/2004 | Brandon et al. | |
| 6,782,644 | B2 | 8/2004 | Fujishima et al. | |
| 6,856,035 | B2 | 2/2005 | Brandon et al. | |
| 7,068,152 | B2 | 6/2006 | Hager | |
| 7,831,364 | B2 | 11/2010 | Bertsch et al. | |
| 7,975,786 | B2 | 7/2011 | Ishii et al. | |
| 8,207,693 | B2 | 6/2012 | Hauser et al. | |
| 8,234,026 | B2 | 7/2012 | Wyatt et al. | |
| 8,511,216 | B2 | 8/2013 | Sasahara et al. | |
| 8,627,642 | B2 * | 1/2014 | Takahashi | B60L 15/2036 56/203 |
| 8,671,656 | B2 | 3/2014 | Paden | |
| 8,720,634 | B2 * | 5/2014 | Takahashi | B60K 7/0007 180/252 |
| 8,838,311 | B2 * | 9/2014 | Koike | B60L 15/36 701/22 |
| 8,844,658 | B2 | 9/2014 | Wyatt et al. | |
| 8,950,520 | B2 | 2/2015 | Hauser et al. | |
| 9,725,114 | B1 * | 8/2017 | Brown | B62D 11/04 |
| 9,764,734 | B1 * | 9/2017 | Brown | B60W 30/143 |
| 9,864,396 | B1 | 1/2018 | Brown et al. | |
| 10,058,031 | B1 | 8/2018 | Brown et al. | |
| 10,183,662 | B1 * | 1/2019 | Bonny | B60W 30/18127 |
| 10,392,007 | B1 * | 8/2019 | Brown | B60W 30/025 |
| 10,562,567 | B2 * | 2/2020 | Koike | B60K 7/0007 |
| 10,629,005 | B1 * | 4/2020 | Brown | G07C 5/0841 |
| 2007/0294991 | A1 * | 12/2007 | Medina | A01D 42/06 56/11.9 |
| 2009/0000839 | A1 | 1/2009 | Ishii et al. | |
| 2010/0106344 | A1 | 4/2010 | Edwards et al. | |
| 2010/0206647 | A1 * | 8/2010 | Ishii | B60L 50/66 180/6.24 |
| 2012/0323420 | A1 | 12/2012 | Koike et al. | |
| 2013/0047566 | A1 | 2/2013 | Takahashi et al. | |
| 2016/0183451 | A1 | 6/2016 | Conrad et al. | |
| 2016/0295797 | A1 | 10/2016 | Ito et al. | |
| 2017/0120755 | A1 | 5/2017 | Ito et al. | |
| 2017/0280623 | A1 | 10/2017 | Yamamura et al. | |
| 2018/0148089 | A1 | 5/2018 | Kuriyagawa et al. | |
| 2019/0075724 | A1 | 3/2019 | Becke et al. | |

FOREIGN PATENT DOCUMENTS

| | | |
|---|---|---|
| JP | S63162338 | 7/1988 |
| JP | S644570 | 1/1989 |

* cited by examiner

UTILITY VEHICLE WITH ONBOARD AND REMOTE CONTROL SYSTEMS

CROSS-REFERENCE

This application is a continuation of U.S. patent application Ser. No. 15/870,341, filed on Jan. 12, 2018, which is a divisional of U.S. patent application Ser. No. 14/925,634, now U.S. Pat. No. 9,867,331, filed on Oct. 28, 2015, which claims the benefit of U.S. Provisional Pat. App. No. 62/168,394, filed on May 29, 2015, and U.S. Provisional Pat. App. No. 62/069,734, filed on Oct. 28, 2014. All of these prior applications are incorporated herein by reference in their entirety.

BACKGROUND OF THE INVENTION

This application relates to utility vehicles generally, and in particular to utility vehicles having both onboard and remote control systems.

SUMMARY OF THE INVENTION

A utility vehicle, such as a ride-on mower or brush cutter, having an electrically actuated drive apparatus capable of receiving operator input from both onboard and remote control systems is disclosed herein. Such a vehicle is ideal for field work in rugged terrain where an onboard operator, for example, encounters excessive slopes that make continued onboard operation hazardous.

The exemplary vehicles described herein (stand-on mowers) have traditional hand controls equipped with position sensors that provide speed and direction inputs to a controller whose outputs independently adjust the output speed and rotational direction of a pair of traction drive units. In certain exemplary vehicles described herein, the controller outputs adjust a pair of electric actuators that control left and right side hydraulic drive circuits. Similar electrically actuated control systems are described in commonly owned U.S. Pat. No. 9,114,798, while similar hand controls and position sensors are described in commonly owned U.S. patent application Ser. No. 14/693,255, now U.S. Pat. No. 9,499,199, both of which are incorporated by reference herein. In another exemplary vehicle, the controller independently adjusts the outputs of a pair of left and right side electric wheel motors. A controller of each exemplary vehicle also communicates with a receiver that accepts operator input from a remote control transmitter when the operator elects to dismount the vehicle.

A better understanding of the objects, advantages, features, properties and relationships of the invention and its elements will be obtained from the following detailed description and accompanying drawings which set forth an illustrative embodiment that is indicative of the various ways in which the principles of the invention may be employed.

DETAILED DESCRIPTION OF THE DRAWINGS

Figure 1:
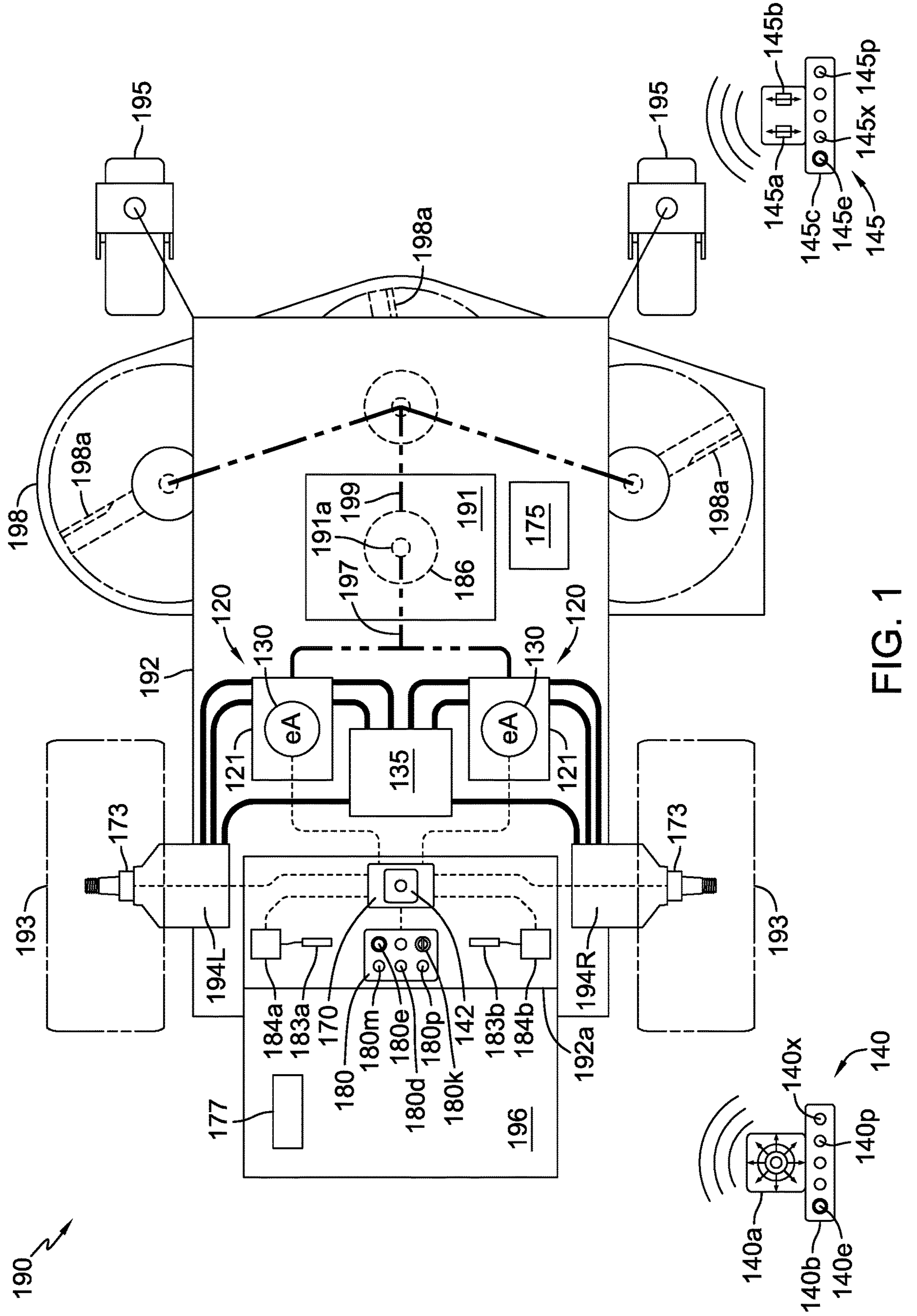
FIG. 1 is a schematic representation of a vehicle equipped with an electrically actuated hydraulic drive system having both onboard and remote control systems.

The description that follows describes, illustrates and exemplifies one or more embodiments of the invention in accordance with its principles. This description is not provided to limit the invention to the embodiment(s) described herein, but rather to explain and teach the principles of the invention in order to enable one of ordinary skill in the art to understand these principles and, with that understanding, be able to apply them to practice not only the embodiment(s) described herein, but also any other embodiment that may come to mind in accordance with these principles. The scope of the invention is intended to cover all such embodiments that may fall within the scope of the appended claims, either literally or under the doctrine of equivalents.

It should be noted that in the description and drawings, like or substantially similar elements may be labeled with the same reference numerals. However, sometimes these elements may be labeled with differing numbers or serial numbers in cases where such labeling facilitates a more clear description. To the extent elements are given numerals that differ in the prefix to those of elements previously described and are not described in detail, it will be understood that such elements can be essentially or substantively identical to the previously described feature. It should also be noted that the drawings set forth herein are representational and not necessarily drawn to scale, and some proportions may be exaggerated to more clearly depict certain features. As stated above, this specification is intended to be taken as a whole and interpreted in accordance with the principles of the invention as taught herein and as understood by one of ordinary skill in the art.

FIG. 1 depicts a representative utility vehicle 190, in this instance a stand-on mower, having a vehicle frame 192 supported by a pair of front caster wheels 195 and a pair of rear drive wheels 193. The vehicle frame 192 may incorporate various structural elements. Vehicle 190 is powered by a prime mover 191, most commonly an internal combustion engine or electric motor. By actuation of electric clutch/brake 186, the output shaft **191*a* of prime mover 191 selectively drives a first belt and pulley assembly 199 to power a mowing deck 198 equipped with rotatable cutting blades 198*a* that is suspended from vehicle frame 192. The output shaft 191*a* continuously drives a second belt and pulley assembly 197 engaged to a pair of drive assemblies 120, each drive assembly 120 comprising a hydraulic pump 121 and an electric actuator 130 for adjusting the hydraulic output thereof. Each hydraulic pump 121 is connected by hydraulic lines to reservoir 135 and to one of the hydraulic motors 194L, 194R powering a rear drive wheel 193. Hydraulic pumps 121 and 221 may be similar to that disclosed in commonly owned U.S. Pat. No. 6,332,393, the disclosure of which is incorporated herein by reference. Hydraulic motors 194L, 194R and 294L, 294**R may be similar to the Model HGM-H motors currently offered by Hydro-Gear of Sullivan, Ill.

Each electric actuator 130 is independently controlled by a drive controller 170 receiving operator inputs to adjust the output of its corresponding hydraulic pump 121, and thus adjust the rotational speed and direction of the corresponding hydraulic motor 194L, 194R and rear drive wheel 193. A power source 175, such as a battery or generator, supplies electrical energy to drive controller 170 and the various electric actuators 130, sensors and switches involved in vehicle control, as well as standard vehicle systems such as an ignition system, in the event the prime mover 191 is an internal combustion engine. A pair of operator control levers 183*a*, 183*b* imparts operator speed and steering commands to the drive controller 170 via corresponding potentiometers or position sensors 184*a*, 184*b* respectively. Such control assemblies may include a return to neutral bias mechanism as depicted in U.S. patent application Ser. No. 14/693,255, now U.S. Pat. No. 9,499,199, the disclosure of which is incorporated herein by reference. As illustrated, drive controller 170, steering levers 183*a*, 183*b*, and position sensors 184*a*, 184*b* are mounted on a control support tower 192*a* fixed to vehicle frame 192. An operator platform 196 affixed to vehicle frame 192 at least partially between rear drive wheels 193 places the operator in functional proximity to the control support tower 192*a*. Operation of left-side control lever 183*a* independently determines the speed and rotational direction of the left-side drive wheel 193, while operation of right-side control lever 183*b* independently determines the speed and rotational direction of the right-side drive wheel 193. A speed sensor 173 monitors the rotational output of each hydraulic motor 194L, 194R at the axle to provide feedback to drive controller 170. As a result, the speed and steered direction of vehicle 190 is determined, including the potential execution of zero radius turns when each of the rear drive wheels 193 is driven in the opposite rotational sense.

A control panel 180 may contain an assortment of operator controls such as a key switch 180*k* with a reverse operating system (ROS) position, a power takeoff (PTO) switch 180*p* which operates mowing deck 198 via actuation of electric clutch/brake 186, and a drive mode switch 180*d* providing, by way of example only, different ranges of travel speeds or acceleration aggressiveness. These and other operator controls, such as an emergency shutdown switch 180*e* and those initiating various auxiliary functions, may be disposed on control panel 180. Other onboard controls and sensors may include a parking brake with position sensor (not shown), which in conjunction with an operator presence pedal/switch 177, determines certain operational vehicle states. For example, vehicle 190 will not start without the parking brake engaged, or continue to run absent an operator if the PTO is engaged.

In addition to onboard controls, vehicle 190 is capable of remote operator control. A receiver 142, e.g. a programmable radio control receiver, which may be mounted proximate to drive controller 170 on control support tower 192*a*, receives signals from an operator control transmitter 140, 145. Receiver 142 then communicates with drive controller 170 via CAN Bus to transmit operator inputs to the drive controller 170. Alternative communication protocols, e.g. SPI, FlexRay and the like, may be utilized in lieu of CAN Bus and will be understood to be subsumed in any reference herein to CAN Bus. One or more control mode switches 180*m* on control panel 180 permit the operator to toggle between remote and onboard operational modes, thereby informing drive controller 170 of the source of expected operator inputs. Receiver 142 is also in communication with an emergency stop mechanism that grounds the magneto of the vehicle ignition system. The receivers disclosed herein may be similar to the RN4P+CAN radio controlled receiver offered by Miratron, Inc. of Portland, Oreg., model number CMD16-10361.

FIG. 1 depicts a first operator control transmitter 140 having a multi-axis joystick 140*a* to input steering and speed commands, and a panel of switches 140*b* including without limitation drive mode switch 140*x*, emergency shutdown switch 140*e* and PTO switch 140*p*, to input, by way of example only, prime mover 191 start/stop commands, PTO start/stop commands, auxiliary function start/stop commands, and emergency stop commands. In an embodiment, control mode switch 180*m* has at least a first position where the drive controller 170 receives steering and speed control inputs from the onboard steering and speed controls, and a second position where the drive controller 170 receives steering and speed control inputs from the operator control transmitter 140.

An alternate operator control transmitter 145 is also depicted in FIG. 1, varying from transmitter 140 in that steering and speed commands are entered independently for the left and right-side drive assemblies 120 by means of left and right-side paddle controls 145*a*, 145*b*. Transmitter 145 has a panel of switches 145*c*, including for example drive mode switch 145*x*, emergency shutdown switch 145*e* and PTO switch 145*p*, and other switches similarly configured to switches 140*b*, and will not be further detailed. The transmitters disclosed herein may be similar to the T1 or T3 transmitters offered by Miratron, Inc.

Each of the transmitters 140, 145 has a finite range. To prevent a runaway condition with a utility vehicle such as the representative stand-on mower 190 when the vehicle travels beyond its controllable range, receiver 142 has the capability to automatically activate the emergency stop mechanism described above when the signal from the transmitter 140, 145 is lost, interrupted or too weak, e.g. transmitter is out of range, signal is obstructed, or batteries become weak.

Other sensors (not shown) in communication with controller 170 may be used to monitor various vehicle components and systems so that controller 170 can automatically activate the emergency stop mechanism if an unsafe operating condition is detected, e.g. overheating, electrical failure, mechanical failure, excessive vehicle tilt.

In an alternate vehicle embodiment, either of the operator control transmitters 140, 145 described above could be used in lieu of the onboard operator control levers 183*a*, 183*b*, position sensors 184*a*, 184*b*, and control panel 180 for onboard vehicle operation. In such instance, the transmitter 140, 145 can be removably mounted to control support tower 192*a*.

Figure 2:
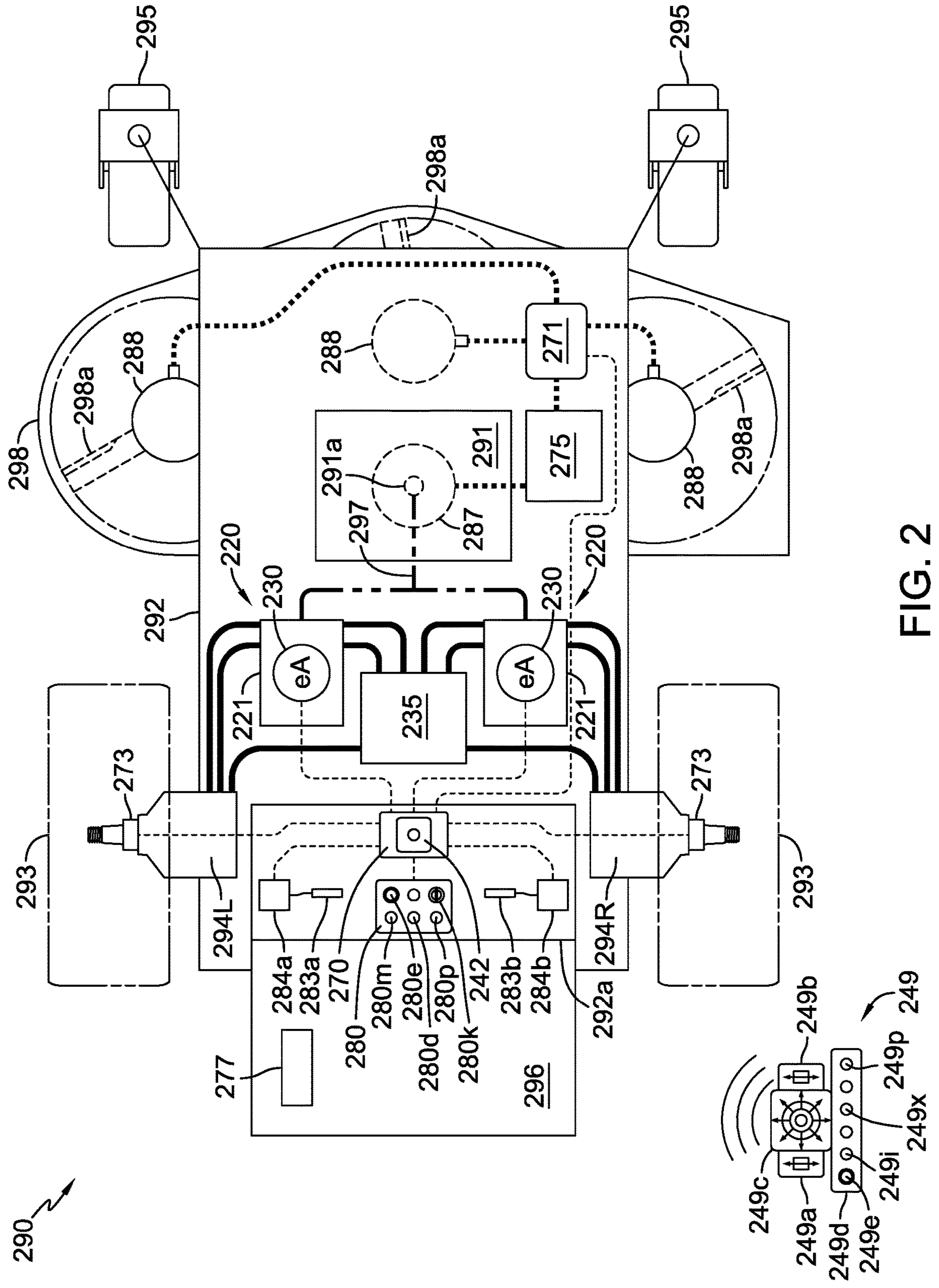
FIG. 2 is a schematic representation of a vehicle equipped with a hybrid power system having electrically actuated hydraulic traction drives, electric deck drives, and both onboard and remote control systems.

FIG. 2 depicts a representative hybrid utility vehicle 290 that is also a stand-on mower similar in some aspects to utility vehicle 190, and having a vehicle frame 292 supported by a pair of front caster wheels 295 and a pair of rear drive wheels 293. However, in vehicle 290, an output shaft 291*a* of prime mover 291 directly or indirectly drives an electric power generating device 287 to continuously maintain electrical charge in a battery 275. Electric power generating device 287 may be a generator, a high capacity alternator or the like. A mowing deck 298 is equipped with one or more rotatable cutting blades 298*a* driven by one or more electric deck motors 288. Electric deck motors 288 are selectively powered by battery 275 via deck motor controller 271. Controller 271 may control each deck motor 288 independently, and power output to each deck motor 288 may be based on work load or other criteria. Similar electric deck motors and deck motor control systems are described in commonly owned U.S. Pat. Nos. 8,227,948 and 8,055,399, respectively, both of which are incorporated by reference herein. Reservoir 235, operator presence pedal/switch 277 and operator platform 296 are also shown in FIG. 2.

The output shaft 291*a* of prime mover 291 also continuously drives a belt and pulley assembly 297 engaged to a pair of hydraulic drive assemblies 220, similar to drive assemblies 120 described previously herein.

Battery 275 also supplies energy to the drive controller 270, electric actuators 230, various sensors and switches involved in vehicle control, and standard vehicle systems e.g. an ignition system. The traction drive system of vehicle 290 is configured substantially the same as in vehicle 190. As in FIG. 1, a pair of operator control levers 283*a*, 283*b* imparts operator speed and steering commands to the drive controller 270 via corresponding potentiometers or position sensors 284*a*, 284*b* respectively, all of which are mounted on control support tower 292*a* fixed to vehicle frame 292, and a speed sensor 273 monitors the rotational output of each hydraulic motor 294L, 294R at the axle to provide feedback to drive controller 270.

A control panel 280 may include operator controls substantially similar to control panel 180, including controls such as a key switch 280*k*, control mode switches 280*m*, drive mode switch 280*d*, and emergency shutdown switch 280*e*. However, in vehicle 290, a PTO switch 280*p* will operate the electric motors 288 of mowing deck 298 via CAN Bus communication between traction controller 270 and deck motor controller 271.

Vehicle 290 is also capable of remote operator control. A receiver 242 in CAN Bus communication with drive controller 270 receives signals from an operator dual control mode transmitter 249. Dual control transmitter 249 includes a first control means comprising left and right-side paddle controls 249*a*, 249*b*, a second control means comprising multi-axis joystick 249*c*, and a panel of switches 249*d*. The panel of switches 249*d* will include a drive mode switch 249*x*, an input selector switch 249*i* for operator selection of paddle control or joystick control, an emergency selector switch 249*e* and a PTO switch 249*p*.

As in vehicle 190, receiver 242 can automatically activate an emergency stop mechanism for vehicle 290 when dual control transmitter 249 is out of range, when its remote control signal is interrupted or when the batteries of transmitter 249 become too weak to provide adequate signal transmission.

Figure 3:
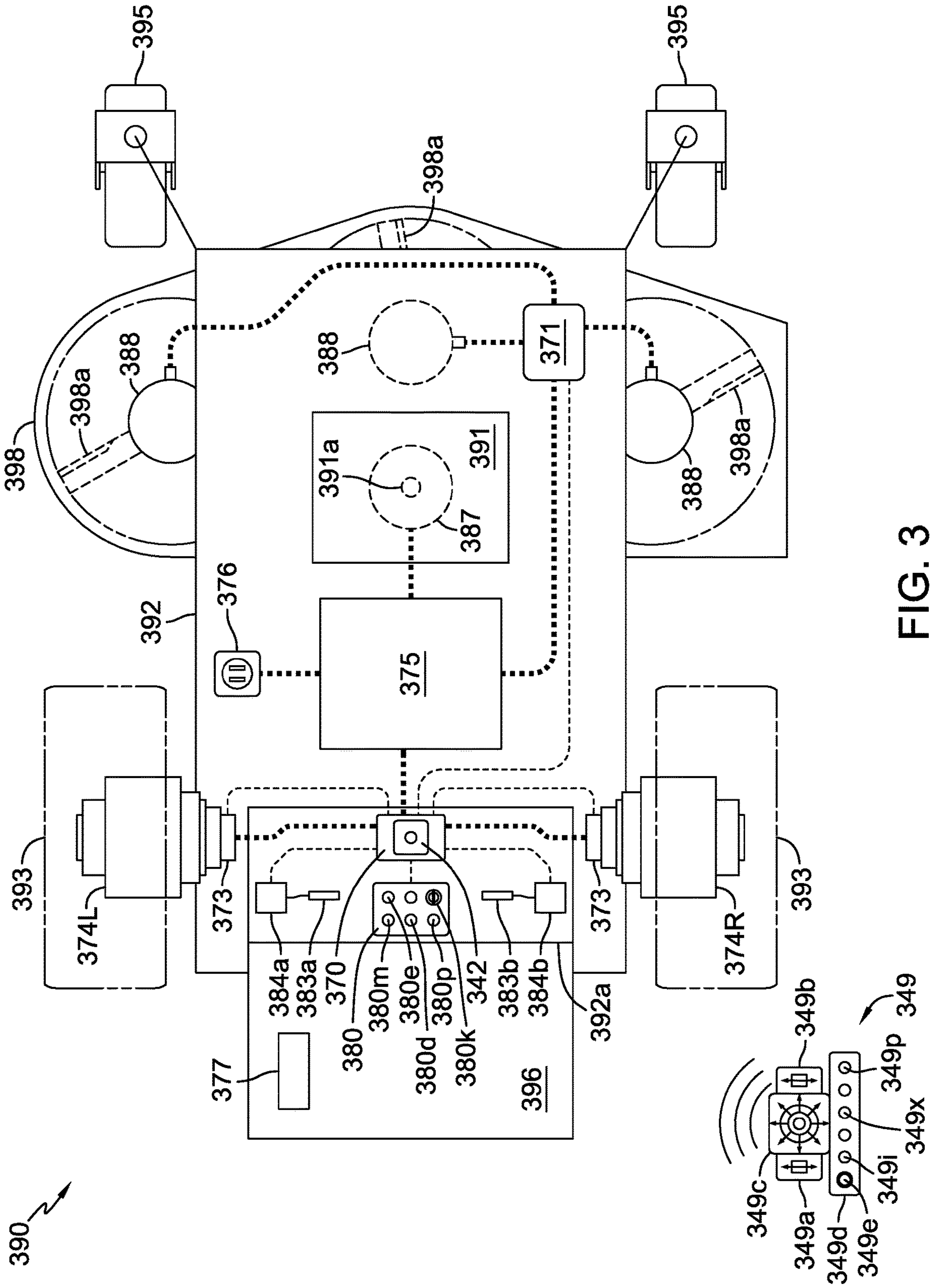
FIG. 3 is a schematic representation of a vehicle equipped with electric traction and deck drive systems, a charging engine and generator combination, and both onboard and remote control systems.

FIG. 3 depicts a representative hybrid utility vehicle 390 that is also a stand-on mower similar in some aspects to utility vehicle 290. In vehicle 390, an output shaft 391*a* of a charging engine 391 directly or indirectly drives an electric power generating device 387 to continuously maintain electrical charge in a battery or battery set 375. Electric power generating device 387 may be a generator, a high capacity alternator or the like. Vehicle 390 also includes a charging receptacle 376 to charge the battery 375 via an external source. Vehicle 390 includes an electrically powered mowing deck 398 that is substantially the same as that previously described for vehicle 290 and includes blades 398*a*. Frame 392 is supported by front casters 395 and a pair of rear drive wheels 393. As in FIG. 1, a pair of operator control levers 383*a*, 383*b* imparts operator speed and steering commands to the drive controller 370 via corresponding potentiometers or position sensors 384*a*, 384*b* respectively, all of which are mounted on control support tower 392*a* fixed to vehicle frame 392, and a speed sensor 373 monitors the rotational output of motors 374L, 374R to provide feedback to drive controller 270. Operator presence/pedal switch 377 and operator platform 396 are also shown in FIG. 3.

In addition to powering electric deck motors 388 via deck motor controller 371, battery 375 also provides power to drive a pair of electric wheel motors 374L, 374R. Each electric wheel motor 374L, 374R is independently controlled by a drive controller 370 receiving operator inputs to adjust its output, and thus adjust the rotational speed and direction of the corresponding rear drive wheel 193. Battery 375 also supplies energy to the drive controller 370, various sensors and switches involved in vehicle control, and standard vehicle systems, e.g. an ignition system.

A control panel 380 may include operator controls substantially similar to control panel 280, including controls such as a key switch 380*k*, control mode switches 380*m*, drive mode switch 380*d*, and emergency shutdown switch 380*e*. As in vehicle 290, a PTO switch 380*p* will operate electric motors 388 of mowing deck 398 via CAN Bus communication between traction controller 370 and deck motor controller 371. It should be noted that these two controllers 370, 371 may be contained in a single housing and may be located as needed in any suitable location on the vehicle.

Vehicle 390 is also capable of remote operator control. A receiver 342 in CAN Bus communication with drive controller 370 receives signals from an operator dual control transmitter 349 that is substantially the same as previously described dual control transmitter 249, and includes a first control means comprising left and right-side paddle controls 349*a*, 349*b*, a second control means comprising multi-axis joystick 349*c*, and a panel of switches 349*d*, including a drive mode switch 349*x*, an input selector switch 349*i* for operator selection of paddle control or joystick control, an emergency selector switch 349*e* and a PTO switch 349*p*. Receiver 342 can automatically activate an emergency stop mechanism when dual control transmitter 349 is out of range, when its remote control signal is interrupted or when the transmitter 349 batteries become too weak to provide adequate signal transmission.

Optionally, a single control transmitter as previously described, i.e. joystick-controlled transmitter 140 or paddles-controlled transmitter 145, can be used to remotely control either of the vehicles 290, 390. It should also be noted that receivers 142, 242, 342 may or may not be packaged or housed with their respective controllers 170, 270, 370, and therefore may be located together or separately in any suitable location on their respective vehicles 190, 290, 390.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the appended claims and any equivalent thereof.

What is claimed is:

1. A utility vehicle having a pair of front wheels and a pair of rear drive wheels, the utility vehicle comprising:
- a charging engine;
- an electric power generating device driven by an output shaft of the charging engine;
- a battery coupled to and charged by the electric power generating device;
- a mowing deck and at least one electric deck motor connected to the battery;
- a power takeoff switch, wherein the at least one electric deck motor is capable of being activated by the power takeoff switch;
- a first electric wheel motor powering one of the pair of rear drive wheels;

a second electric wheel motor powering the other of the pair of rear drive wheels, wherein the first and second electric wheel motors are each connected to the battery;

a drive controller in communication with the first and second electric wheel motors to control the output thereof via onboard steering and speed controls;

a radio control receiver in communication with the drive controller;

a radio control transmitter having steering and speed controls, the radio control transmitter capable of being in communication with the radio control receiver; and a control mode switch having at least a first position, where the drive controller receives steering and speed control inputs from the onboard steering and speed controls in an onboard control mode, and a second position where the drive controller receives steering and speed control inputs from the radio control transmitter in a radio control mode.

2. The utility vehicle of claim 1, wherein the power takeoff switch is disposed on the vehicle, and the radio control transmitter comprises a second power takeoff switch, wherein the at least one electric deck motor is capable of being activated by the second power takeoff switch.

3. The utility vehicle of claim 2, wherein the at least one electric deck motor comprises a plurality of electric deck motors that are each capable of being activated by the power takeoff switch and the second power takeoff switch.

4. The utility vehicle of claim 1, further comprising an emergency shutdown switch mounted to the radio control transmitter and capable of actuating an emergency shutdown of the utility vehicle.

5. The utility vehicle of claim 4, wherein the radio control receiver automatically activates the emergency shutdown when a signal from the radio control transmitter is lost, interrupted or too weak.

6. The utility vehicle of claim 1 further comprising an operator platform mounted at least partially between the pair of rear drive wheels and a control support tower adjacent to the operator platform.

7. The utility vehicle of claim 1, further comprising a deck motor controller which communicates with the drive controller via CAN Bus, and the drive controller communicates with the radio control receiver via CAN bus.

8. The utility vehicle of claim 7, wherein the power takeoff switch is in communication with the drive controller to activate the at least one electric deck motor by providing electric power from the battery to the at least one electric deck motor.

9. The utility vehicle of claim 8, further comprising an emergency shutdown switch mounted to the radio control transmitter and capable of actuating an emergency shutdown of the utility vehicle.

10. A utility vehicle having a pair of front wheels and a pair of rear drive wheels, the utility vehicle comprising:

a charging engine coupled to an electric power generating device;

a battery coupled to the electric power generating device;

a mowing deck comprising at least one electric deck motor mounted on the mowing deck and powered by the battery;

a first electric wheel motor powering one of the pair of rear drive wheels and a second electric wheel motor powering the other of the pair of rear drive wheels;

an operator platform mounted adjacent to the pair of rear drive wheels;

a control support tower comprising onboard steering and speed controls disposed on the control support tower, wherein the control support tower is positioned adjacent to the operator platform;

a drive controller in communication with the first and second electric wheel motors to control the output thereof and in communication with the onboard steering and speed controls;

a deck motor controller in communication with the drive controller and with the at least one electric deck motor;

a radio control receiver in communication with the drive controller;

a radio control transmitter separate from the vehicle and having steering and speed controls, the radio control transmitter capable of being in communication with the radio control receiver; and a control mode switch disposed on the vehicle and having at least a first position, where the drive controller receives steering and speed control inputs from the onboard steering and speed controls in an onboard control mode, and a second position where the drive controller receives steering and speed control inputs from the radio control transmitter in a radio control mode.

11. The utility vehicle of claim 10, further comprising a power takeoff switch disposed on the utility vehicle, wherein the at least one electric deck motor is capable of being activated by the power takeoff switch.

12. The utility vehicle of claim 11, wherein the radio control transmitter comprises a second power takeoff switch, wherein the at least one electric deck motor is capable of being activated by the second power takeoff switch.

13. The utility vehicle of claim 10, wherein the first and second electric wheel motors each comprise a separate speed sensor connected to the drive controller.

14. The utility vehicle of claim 10, further comprising an emergency shutdown switch mounted to the radio control transmitter and capable of actuating an emergency shutdown of the utility vehicle.

15. The utility vehicle of claim 10, wherein the deck motor controller communicates with the drive controller via CAN Bus, and the drive controller communicates with the radio control receiver via CAN bus.

16. A utility vehicle having a pair of front wheels and a pair of rear drive wheels, the utility vehicle comprising:

a battery coupled to an electric power generating device;

a mowing deck and at least one electric deck motor connected to the battery;

a first electric wheel motor powering one of the pair of rear drive wheels;

a second electric wheel motor powering the other of the pair of rear drive wheels;

a drive controller in communication with the first and second electric wheel motors to control the output thereof and in communication with onboard steering and speed controls;

a radio control receiver in communication with the drive controller;

a deck motor controller which communicates with the drive controller via CAN Bus, and the drive controller communicates with the radio control receiver via CAN bus;

a radio control transmitter having steering and speed controls and in communication with the radio control receiver; and a control mode switch having at least a first position, where the drive controller receives steering and speed control inputs from the onboard steering and speed controls in an onboard control mode, and a second position where the drive controller receives steering and speed control inputs from the radio control transmitter in a radio control mode.

17. The utility vehicle of claim 16, further comprising a power takeoff switch in communication with the deck motor controller through the drive controller, wherein the power takeoff switch is capable of activating the at least one electric deck motor by providing electric power from the battery to the at least one electric deck motor.

18. The utility vehicle of claim 17, wherein the power takeoff switch is disposed on the vehicle, and the radio control transmitter comprises a second power takeoff switch, wherein the at least one electric deck motor is capable of being activated by the second power takeoff switch.

19. The utility vehicle of claim 16, further comprising an operator platform mounted at least partially between the pair of rear drive wheels and a control support tower adjacent to the operator platform.

20. The utility vehicle of claim 16, further comprising an emergency shutdown switch mounted to the radio control transmitter and capable of actuating an emergency shutdown of the utility vehicle when a signal from the radio control transmitter is lost, interrupted or too weak.

* * * * *